United States Patent
Murad et al.

(10) Patent No.: US 11,288,553 B1
(45) Date of Patent: Mar. 29, 2022

(54) METHODS AND SYSTEMS FOR BOWL VIEW STITCHING OF IMAGES

(71) Applicant: GM GLOBAL TECHNOLOGY OPERATIONS LLC, Detroit, MI (US)

(72) Inventors: Mohannad Murad, Troy, MI (US); Wende Zhang, Birmingham, MI (US); Kevin K. Hoang, Sterling Heights, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/072,095

(22) Filed: Oct. 16, 2020

(51) Int. Cl.
*G06K 9/62* (2006.01)
*G06K 9/00* (2006.01)

(52) U.S. Cl.
CPC ....... *G06K 9/6289* (2013.01); *G06K 9/00805* (2013.01); *G06K 9/629* (2013.01)

(58) Field of Classification Search
None
See application file for complete search history.

(56) References Cited

U.S. PATENT DOCUMENTS

| | | | |
|---|---|---|---|
| 2013/0250041 A1* | 9/2013 | Chou | H04N 5/232123 348/36 |
| 2015/0254825 A1* | 9/2015 | Zhang | B60R 1/00 382/284 |
| 2018/0095533 A1* | 4/2018 | Song | H04N 5/23238 |
| 2018/0232851 A1 | 8/2018 | Scholl et al. | |

FOREIGN PATENT DOCUMENTS

DE 102019112175 A1 11/2019

* cited by examiner

*Primary Examiner* — David Perlman
(74) *Attorney, Agent, or Firm* — Lorenz & Kopf LLP

(57) ABSTRACT

A system and method are provided for aiding an operator in operating a vehicle. In one embodiment, a system includes a sensor system configured to generate sensor data sensed from an environment of the vehicle. The system further includes a control module configured to, by a processor, generate a bowl view image of the environment based on the sensor data, identify at least one of a double object and a missing object in the bowl view image, generate a second bowl view image of the environment by re-stitching the sensor data based on the at least one of double object and missing object, and generate display data based on the second bowl view image.

18 Claims, 5 Drawing Sheets

METHODS AND SYSTEMS FOR BOWL VIEW STITCHING OF IMAGES

TECHNICAL FIELD

This technical field generally relates to operator aid systems for vehicles, and more particularly, relates to methods and systems for providing of a view image of a vehicle environment in a predefined geometry shape such as a bowl view.

Vehicles may incorporate and utilize numerous aids to assist the operator. For example, various sensors may be disposed at various locations of the vehicle. The various sensors sense observable conditions of the environment of the vehicle. For example, a plurality of cameras or other sensors may sense a condition of the road or environment that the vehicle is traveling or about to travel. In some instances, it is desirable to present to an operator a view of the environment of the vehicle. In such instances, the images provided by the various cameras must be stitched together to create the full view.

Accordingly, it is desirable to provide methods and systems for improved stitching of a plurality of images into a single image. Other desirable features and characteristics of the herein described embodiments will become apparent from the subsequent detailed description and the appended claims, taken in conjunction with the accompanying drawings and the foregoing technical field and background.

SUMMARY

In one exemplary embodiment, a system and method are provided for aiding an operator in operating a vehicle. In one embodiment, a system includes a sensor system configured to generate sensor data sensed from an environment of the vehicle. The system further includes a control module configured to, by a processor, generate a bowl view image of the environment based on the sensor data, identify at least one of a double object and a missing object in the bowl view image, generate a second bowl view image of the environment by re-stitching the sensor data based on the at least one of double object and missing object, and generate display data based on the second bowl view image.

In various embodiments, the sensor system includes a plurality of cameras. In various embodiments, the control module is configured to perform the re-stitching of the sensor data based on a bowl width determined from the at least one of double object and missing object.

In various embodiments, the control module is further configured to, by the processor, compute a sharpness value of an area associated with the double object, and determine the bowl width based on the sharpness value. In various embodiments, the control module is further configured to, by the processor, vary a bowl depth for a defined range of depths, re-stitch the sensor data from two sensors based on the varied bowl depths, compute the sharpness value of the area associated with the double object for each varied bowl depth, and select a bowl depth corresponding to a defined sharpness value to determine the bowl width.

In various embodiments, the control module is further configured to, by the processor, determine feature points of the double object, and determine the bowl width based on the feature points. In various embodiments, the control module is further configured to, by the processor, adjust an initial bowl width, perform a re-stitching of the sensor data based on the adjusted initial bowl width, and evaluate the feature points of the double object to determine the bowl width. In various embodiments, the control module is further configured to, by the processor, select the adjusted initial bowl width that corresponds to the feature points of the double object merging as the bowl width.

In various embodiments, the control module is further configured to, by the processor, determine a depth of the feature point based on triangulation, and determine the bowl width based on the depth of the feature point.

In various embodiments, the system further includes a display system within vehicle, and wherein the display system displays the bowl view image to the operator of the vehicle.

In another embodiment, a method includes: receiving sensor data from a sensor system that senses an environment of the vehicle; generating, by a processor, a bowl view image of the environment based on the sensor data; identifying, by the processor, at least one of a double object and a missing object in the bowl view image; generating, by the processor, a second bowl view image of the environment by re-stitching the sensor data based on the at least one of double object and missing object; and generating, by the processor, display data based on the second bowl view image.

In various embodiments, the sensor system includes a plurality of cameras. In various embodiments, the method includes re-stitching of the sensor data based on a bowl width determined from the at least one of double object and missing object.

In various embodiments, the method includes computing a sharpness value of an area associated with the double object and determining the bowl width based on the sharpness value. In various embodiments, the method includes varying a bowl depth for a defined range of depths, re-stitching the sensor data from two sensors based on the varied bowl depths, computing the sharpness value of the area associated with the double object for each varied bowl depth, and selecting a bowl depth corresponding to a defined sharpness value to determine the bowl width.

In various embodiments, the method includes determining feature points of the double object, and determining the bowl width based on the feature points. In various embodiments, the method includes adjusting an initial bowl width, performing a re-stitching of the sensor data based on the adjusted initial bowl width, and evaluating the feature points of the double object to determine the bowl width. In various embodiments, the method includes selecting the adjusted initial bowl width that corresponds to the feature points of the double object merging as the bowl width.

In various embodiments, the method includes determining a depth of the feature point based on triangulation and determining the bowl width based on the depth of the feature point.

In various embodiments, the method includes displaying, by a display system within the vehicle, the bowl view image to the operator of the vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
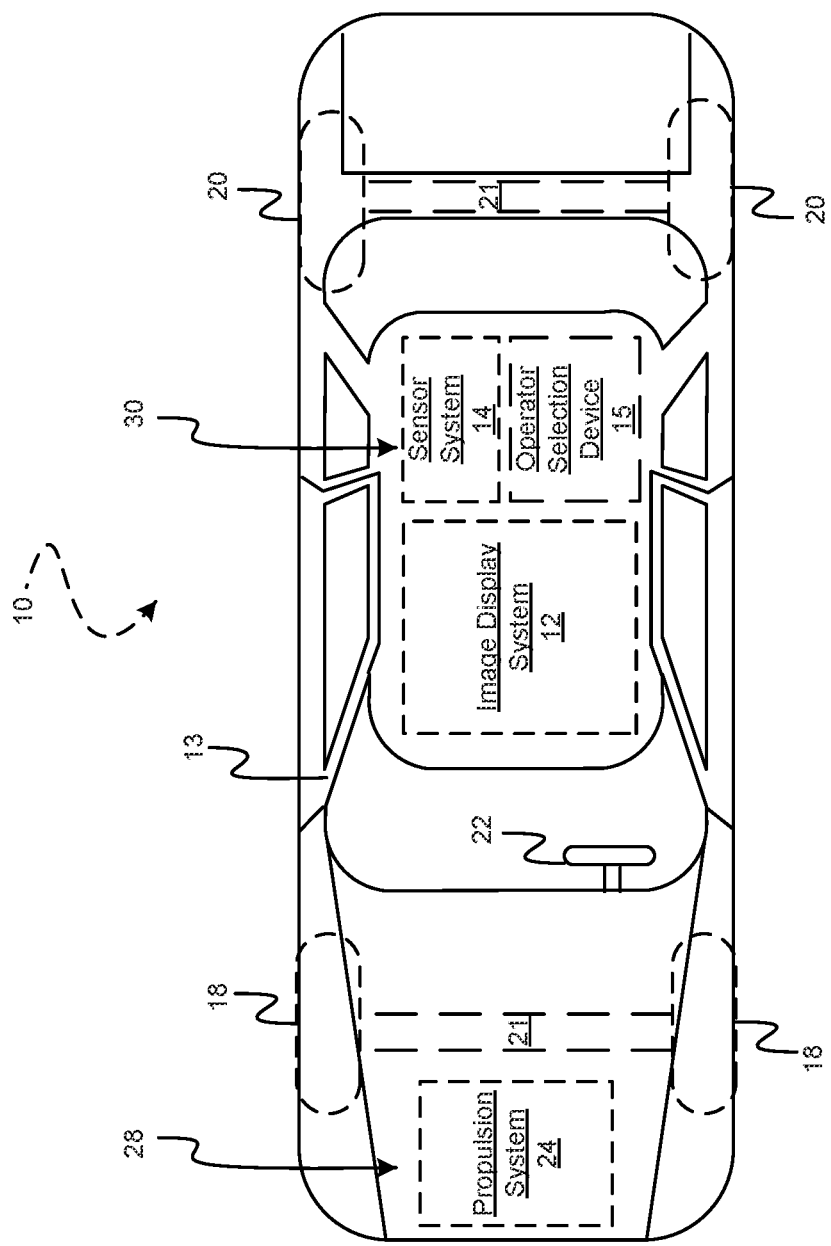
FIG. 1 is an illustration of a top perspective schematic view of a vehicle having an image display system in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term system or module may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group), memory that contains one or more executable software or firmware programs and associated data, a combinational logic circuit, and/or other suitable components that provide the described functionality.

Embodiments may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment of the invention may employ various combinations of mechanical components, e.g., towing apparatus, indicators or telltales; and electrical components, e.g., integrated circuit components, memory elements, digital signal processing elements, logic elements, look-up tables, imaging systems and devices or the like, which may carry out a variety of functions under the control of one or more microprocessors or other control devices. In addition, those skilled in the art will appreciate that the herein described embodiments may be practiced in conjunction with any number of mechanical and/or electronic systems, and that the vehicle systems described herein are merely exemplary.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

FIG. 1 is an illustration of a top view of a vehicle shown generally at 10 equipped with an image display system shown generally at 12 in accordance with various embodiments. As will be discussed in more detail below, the image display system 12 generally uses data from a sensor system 14 of the vehicle 10 along with customizable software to allow a user to experience a bowl view image of the environment of the vehicle 10. A display screen 16 (FIG. 2) can be placed in any location of the vehicle 10 and can display images and/or videos that create the image of the environment of the vehicle 10. A bowl view image, for example, includes surround camera images (front, rear, and sides) that are mapped to different parts of a defined bowl. The bowl is defined to start flat close to where the vehicle 10 is positioned and then adjust a curvature to extend vertical at some distance from the host vehicle. The distance at where the bowl is adjusted to vertical can be provided from a proximity sensor such as a radar or ultrasound that measure how far surround objects are. In some instances, double objects appear in the image when objects further than the point where the bowl becomes vertical. The image display system 12 recognizes and mitigates the double or missing objects based on the methods and systems disclosed herein.

Although the context of the discussion herein is with respect to the vehicle 10 being a passenger car, it should be understood that the teachings herein are compatible with all types of vehicle such as aircraft, watercraft, sport utility vehicles, and automobiles including, but not limited to, sedans, coupes, sport utility vehicles, pickup trucks, minivans, full-size vans, trucks, and buses as well as any type of towed vehicle such as a trailer.

As shown in the example of FIG. 1, the vehicle 10 generally includes a body 13, front wheels 18, rear wheels 20, a suspension system 21, a steering system 22, and a propulsion system 24. The wheels 18-20 are each rotationally coupled to the vehicle 10 near a respective corner of the body 13. The wheels 18-20 are coupled to the body 13 via the suspension system 21. The wheels 18 and/or 20 are driven by the propulsion system 24. The wheels 18 are steerable by the steering system 22.

The body 13 is arranged on or integrated with a chassis (not shown) and substantially encloses the components of the vehicle 10. The body 13 is configured to separate a powertrain compartment 28 (that includes at least the propulsion system 24) from a passenger compartment 30 that includes, among other features, seating (not shown) for one or more occupants of the vehicle 10.

The vehicle 10 further includes a sensor system 14 and an operator selection device 15. The sensor system 14 includes one or more sensing devices that sense observable conditions of components of the vehicle 10 and/or that sense observable conditions of the exterior environment of the vehicle 10. The sensing devices can include, but are not limited to, radars, lidars, global positioning systems, optical cameras, thermal cameras, ultrasonic sensors, height sensors, pressure sensors, steering angle sensors, depth or proximity sensors, and/or other sensors. The operator selection device 15 includes one or more user manipulable devices that can be manipulated by a user in order to provide input. The input can relate to, for example, activation of the display of virtual reality content and a desired viewing angle of the content to be displayed. The operator selection device 15 can include a knob, a switch, a touch screen, a voice recognition module, etc.

Figure 2:
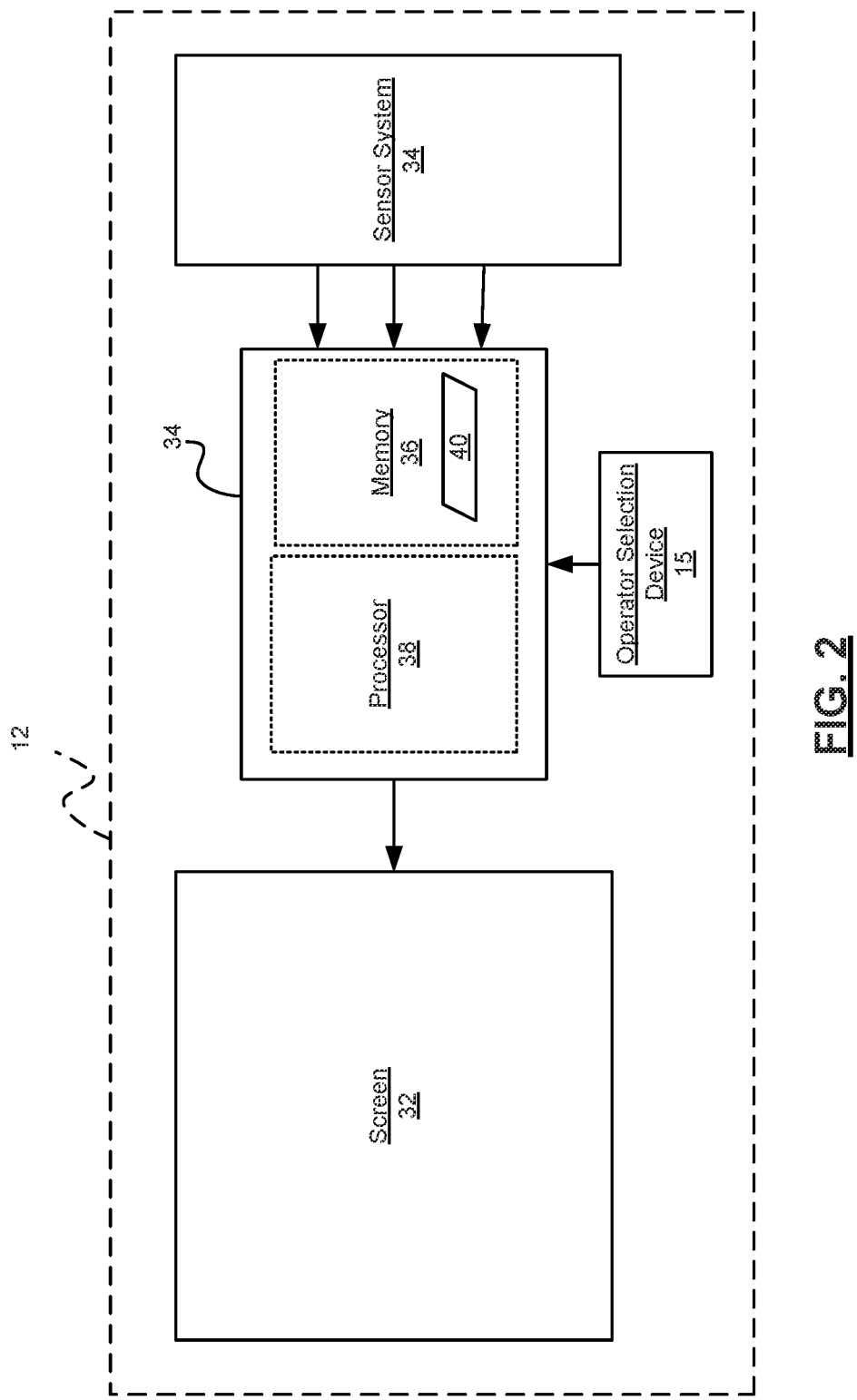
FIG. 2 is a functional block diagram illustrating an image display system in accordance with various embodiments.

As shown in more detail in FIG. 2 and with continued reference to FIG. 1, the image display system 12 includes a display screen 32 communicatively coupled to a control module 34. The control module 34 is communicatively coupled to the sensor system 14 and the operator selection device 15.

The display screen 32 may be disposed within the passenger compartment 30 at a location that enables viewing by an operator of the vehicle 10. For example, the display screen 32 may integrated with an infotainment system (not shown) or instrument panel (not shown) of the vehicle 10. The display screen 32 displays content such that the bowl view is experienced by the viewer.

With reference to FIG. 2, the control module 34 may be dedicated to the display screen 32, may control the display screen 32 and other features of the vehicle 10 (e.g., a body control module, an instrument control module, or other feature control module), and/or may be implemented as a combination of control modules that control the display screen 32 and other features of the vehicle 10. For exemplary purposes, the control module 34 will be discussed and illustrated as a single control module that is dedicated to the display screen 32. The control module 34 controls the display screen 32 directly and/or communicates data to the display screen 32 such that bowl view content can be displayed.

The control module 34 includes at least memory 36 and a processor 38. As will be discussed in more detail below, the control module 34 includes instructions that when processed by the processor 38 control the content to be displayed on the display screen 32 based on sensor data received from the sensor system 14 and user input received from the operator selection device 15. The control module further includes instructions that when processed by the processor 38 control the content to be displayed based on the methods and systems disclosed herein.

Figure 3:
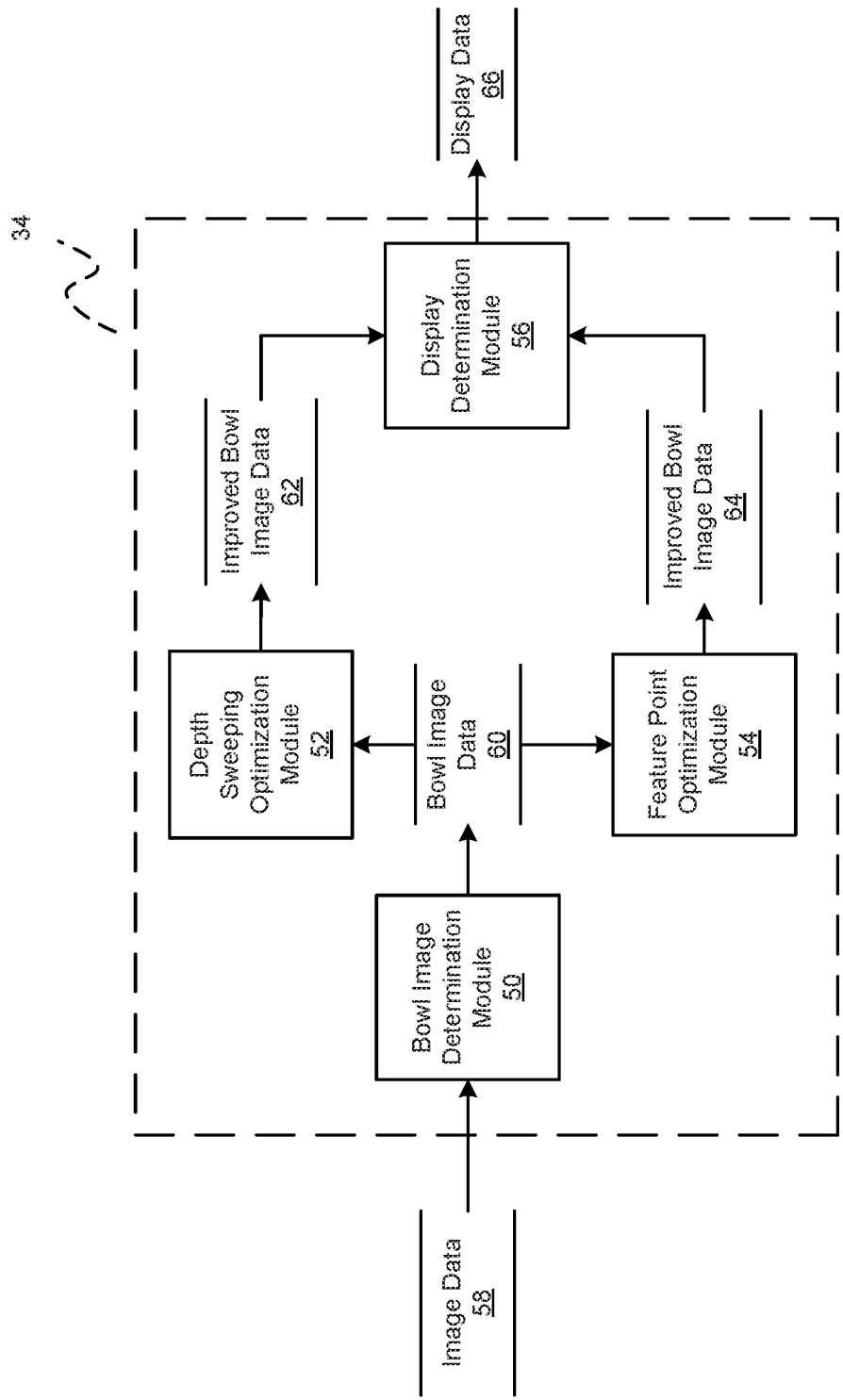
FIG. 3 is a dataflow diagram illustrating the control module of the image display system in accordance with various embodiments.

Referring now to FIG. 3 and with continued reference to FIG. 1-2, a dataflow diagram illustrates various embodiments of the control module 34 in greater detail. Various embodiments of the control module 34 according to the present disclosure may include any number of sub-modules. As can be appreciated, the sub-modules shown in FIG. 4 may be combined and/or further partitioned to similarly generate bowl view content to be viewed by an operator. Inputs to the control module 34 may be received from the sensor system 14, received from the operator selection device 15, received from other control modules (not shown) of the vehicle 10, and/or determined by other sub-modules (not shown) of the control module 34.

In various embodiments, the control module 34 includes a bowl image determination module 50, a depth sweeping optimization module 52, a feature point optimization module 54, and a display determination module 56. As can be appreciated, one or both of the depth sweeping optimization module 52 and the feature point optimization module 54 can be implemented in the control module 34, in various embodiments, in order to optimize the stitching of the images in the bowl view.

In various embodiments, the bowl image determination module 50 receives as input image data from the sensor system 14 of the vehicle 10. For example, the image data includes images taken by the various sensors of the vehicle 10. In various embodiments, the image data 58 can include a front image, a left side image, a right side image, and a rear side image. As can be appreciated, any number of images can be included in various embodiments.

The bowl image determination module 50 maps pixels of the images to pixels of a defined bowl. For example, the front image is mapped to front pixels of the bowl; the left side image is mapped to left side pixels of the bowl; the right side image is mapped to right side pixels of the bowl; and the rear image is mapped to rear side pixels of the bowl. The bowl image determination module 50 then stitches the pixels of the images in sections of the bowl where the images overlap using one or more stitching and alpha blending techniques known in the art to produce bowl image data 60.

The depth sweeping optimization module 52 receives as input the bowl image data 60. The depth sweeping optimization module 52 evaluates the bowl image data 60 for double and/or missing objects. When double or missing objects occur, the depth sweeping optimization module 52 mitigates the double or missing object by optimizing the stitching of the images that creates the double or missing objects.

For example, the depth sweeping optimization module 52 enhances the bowl view stitching by adjusting a width of the bowl until the best sharpness of the missing or double object is achieved. In various embodiments, for example, the depth sweeping optimization module 52 synthesizes images from two or more of the sensors at various depths (di) and computes a sharpness value of an area around the object at each depth di. The depth sweeping optimization module 52 then identifies an actual depth (da) of the object as the area that yields the highest sharpness among the depths (di). The actual depth (da) is then used by the depth sweeping optimization module 52 to determine the bowl width to re-stitch the images to produce improved bowl image data 62.

The feature point optimization module 54 receives as input the bowl image data 60. The feature point optimization module 54 evaluates the bowl image data 60 for double objects. When double objects occur, the feature point optimization module 54 mitigates the double object by optimizing the stitching of the images that create the double objects.

For example, the feature point optimization module 54 enhances the bowl view image by adjusting the bowl width until redundant feature points within a region of interest are eliminated. In various embodiments, for example, the feature point optimization module 54 identifies points of features of the double objects within the stitching region of the bowl image data. The feature point optimization module 54 selects a first bowl width that shows the double objects and then adjusts (e.g., by expanding) the bowl width to a width (dm) at which the points of the features merge. The bowl depth (dm) is then used by the feature optimization module to re-stitch the images to produce improved bowl image data 64.

In another example, the feature point optimization module 54 identifies a depth of a feature point using triangulation or some other method using known dimensions of an object and a location from a sensor such as a radar or lidar. The feature point optimization module 54 uses the depth of the feature point to determine the bowl width.

The display determination module 56 receives as input the improved bowl image data 62, and the improved bowl image data 64. Based on the received data 62, 64, the display determination module 56 generates display data 66 that includes a bowl view image that mitigates double and/or missing objects. In various embodiments, when both of the depth sweeping optimization module 52 and the feature point optimization module 54 are implemented, the display determination module 56 generates the display data 66 based on one of the improved bowl image data 62 and the improved bowl image data 64 (e.g., the one providing the best results), or based on a combination of the improved bowl image data 62 and the improved bowl image data 64. As can be appreciated, the improved bowl image data 64 can apply to dynamic events and one or more filtering methods can be performed to smooth transitions between images with different stitching before displaying the images.

Figure 4:
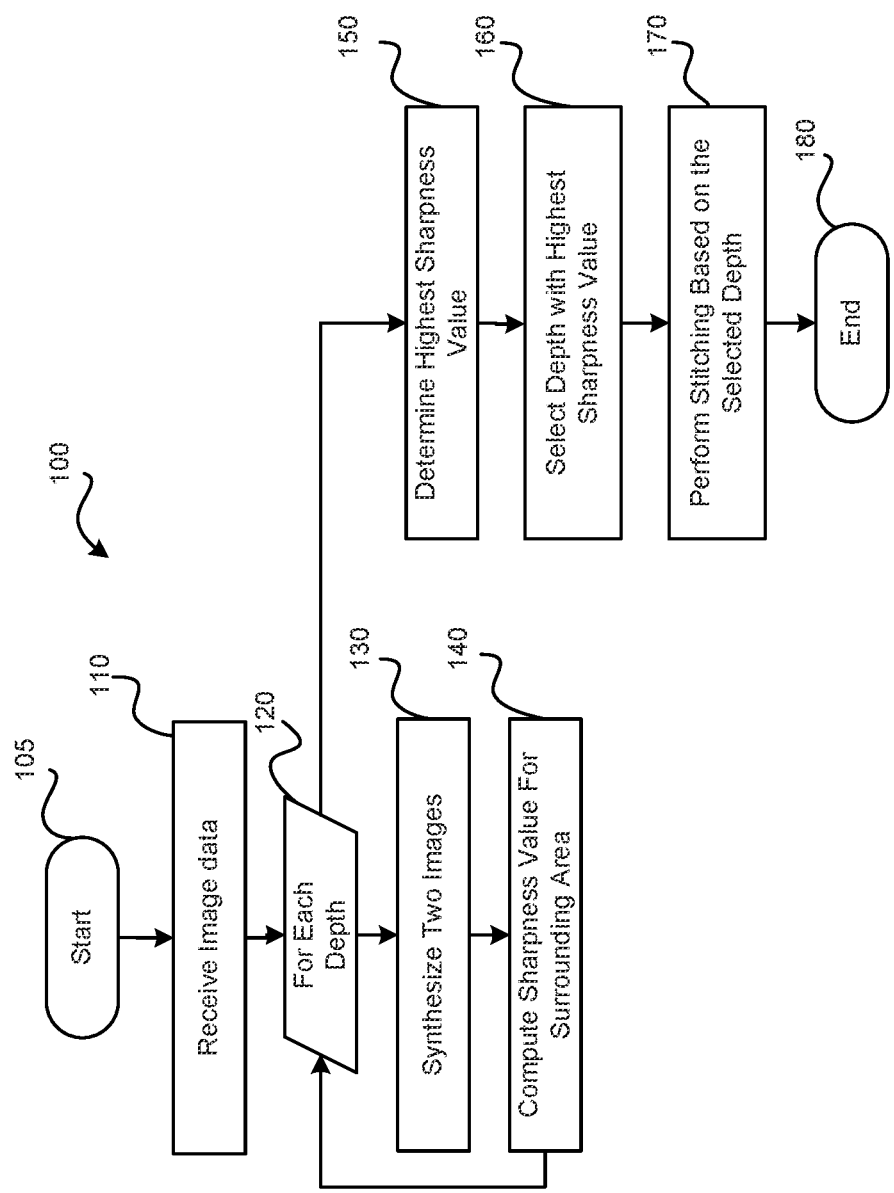
FIGS. 4 and 5 are flowcharts illustrating methods of controlling content to be displayed on a display screen of the image display system in accordance with various embodiments.
Figure 5:
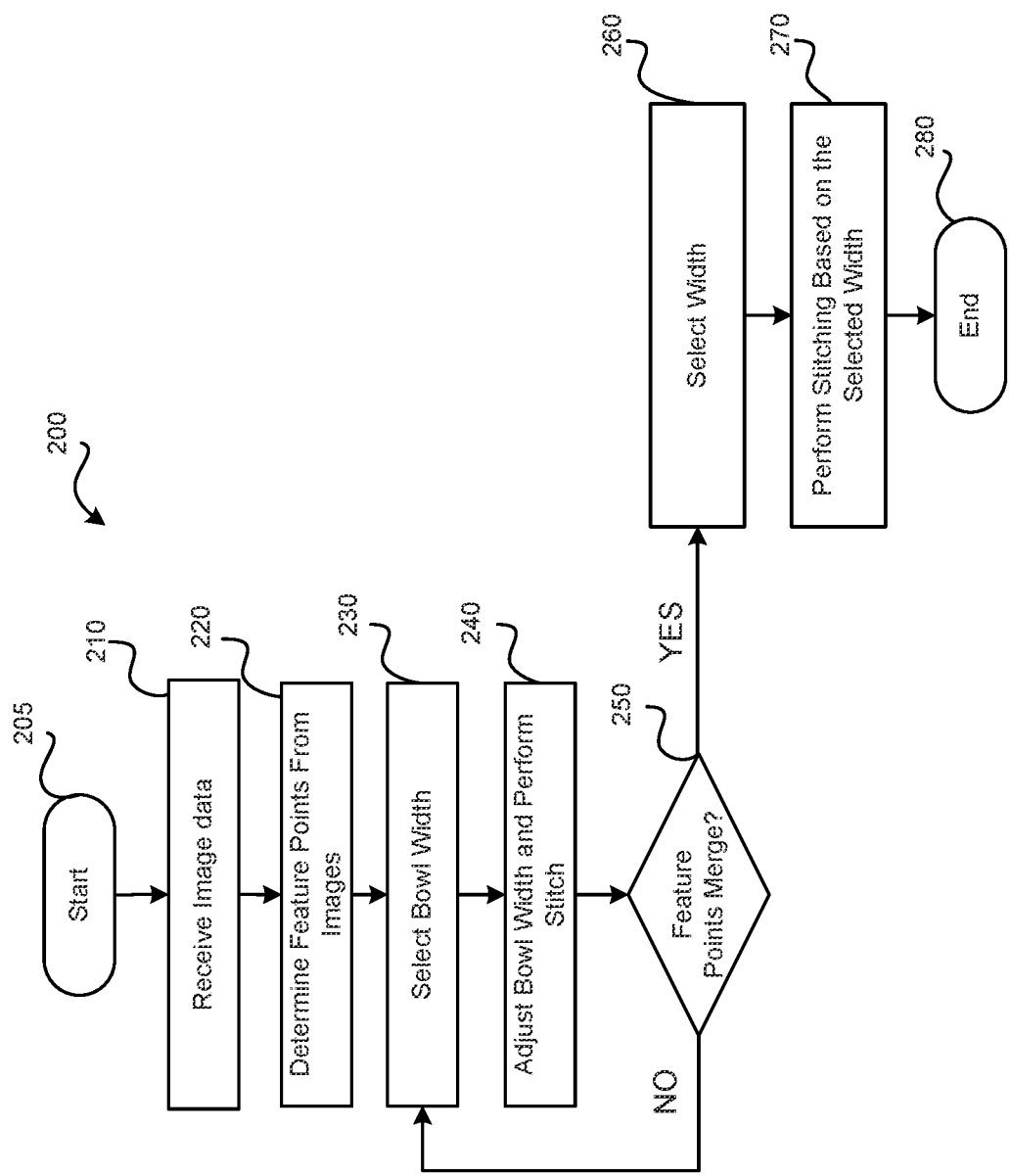

Referring now to FIGS. 4 and 5, and with continued reference to FIGS. 1-3 flowcharts illustrate methods 100, 200 that can be performed by the image display system 12 in accordance with various embodiments. As can be appreciated in light of the disclosure, the order of operation within the methods 100, 200 is not limited to the sequential execution as illustrated in FIGS. 4 and 5 but may be performed in one or more varying orders as applicable and in accordance with the present disclosure.

As can further be appreciated, the methods 100, 200 of FIGS. 4 and 5 may be scheduled to run at predetermined time intervals during operation of the vehicle 10 and/or may be scheduled to run based on predetermined events.

As shown in FIG. 4, the method 100 determines the improved bowl image data using depth sweeping. In various embodiments, the method 100 may be performed by the control module 34 of FIGS. 1 and 2 and, more particularly, by the depth sweeping optimization module 52 of FIG. 3.

In one example, the method may begin at 105. The image data is received at 110. For each depth (di) in a range of depths at 120, the two images creating the double or missing object are synthesized at 130. A sharpness value of an area around the object at each depth (di). Once each depth has been processed at 120, the highest sharpness value is determined at 150; and the depth (di) corresponding to the highest sharpness value is selected at 160. Stitching is then performed using the selected depth for determining the width of the bowl at 170 to produce the improved bowl image data. Thereafter, the method may end at 180.

As shown in FIG. 5, the method 200 determines the improved bowl image data using feature points. In various embodiments, the method 200 may be performed by the control module 34 of FIGS. 1 and 2 and, more particularly, by the feature point optimization module 54 of FIG. 3.

In one example, the method may begin at 205. The image data is received at 210. Points of features of the double objects are identified within the stitching region of the bowl image data at 220. A first bowl width that shows the double object is selected at 230. The first bowl width is adjusted (e.g., by expanding) and the images are re-stitched at 240. It is determined whether the feature points of the double object merge at 250. When the feature points do not merge at 250, a new width is selected at 240 and the method continues.

When the feature points merge at 250, the width is selected at 260. Stitching is then performed using the selected width of the bowl at 270 to produce the improved bowl image data. Thereafter, the method may end at 280.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system to aid an operator in operating a vehicle, comprising:
   a sensor system disposed on the vehicle and configured to generate sensor data sensed from an environment of the vehicle; and
   a control module configured to, by a processor, generate a bowl view image of the environment based on the sensor data, identify at least one of a double object and a missing object in the bowl view image, adjust a depth associated with the bowl view until a defined sharpness value of an area outside of the at least one of double object and missing object is achieved, generate a second bowl view image of the environment by re-stitching the sensor data based on the adjusted depth, and generate display data based on the second bowl view image.

2. The system of claim 1, wherein the sensor system includes a plurality of cameras.

3. The system of claim 1, wherein the control module is further configured to, by the processor, compute the sharpness value of the area at the adjusted bowl depth, and determine a bowl width based on the sharpness value and the bowl depth, and wherein the second bowl view image is generated based on the bowl width.

4. The system of claim 3, wherein the control module is further configured to, by the processor, vary the bowl depth for a defined range of depths, re-stitch the sensor data from two sensors based on the varied bowl depths, compute the sharpness value of the area for each varied bowl depth, and select a bowl depth corresponding to the defined sharpness value to determine the bowl width.

5. The system of claim 3, wherein the control module is further configured to, by the processor, determine feature points of the double object, and determine the bowl width based on the feature points.

6. The system of claim 5, wherein the control module is further configured to, by the processor, adjust an initial bowl width, perform a re-stitching of the sensor data based on the adjusted initial bowl width, and evaluate the feature points of the double object to determine the bowl width.

7. The system of claim 6, wherein the control module is further configured to, by the processor, select the adjusted initial bowl width that corresponds to the feature points of the double object merging as the bowl width.

8. The system of claim 5, wherein the control module is further configured to, by the processor, determine a depth of the feature point based on triangulation, and determine the bowl width based on the depth of the feature point.

9. The system of claim 1, further comprising a display system within vehicle, and wherein the display system displays the bowl view image to the operator of the vehicle.

10. A method for aiding an operator in operating a vehicle, comprising:
   receiving sensor data from a sensor system of the vehicle that senses an environment of the vehicle;
   generating, by a processor, a bowl view image of the environment based on the sensor data;
   identifying, by the processor, at least one of a double object and a missing object in the bowl view image;
   adjusting, by the processor, a depth associated with the bowl view until a defined sharpness value of an area outside of the at least one of double object and missing object is achieved;
   generating, by the processor, a second bowl view image of the environment by re-stitching the sensor data based on the adjusted depth; and
   generating, by the processor, display data based on the second bowl view image.

11. The method of claim 10, wherein the sensor system includes a plurality of cameras.

12. The method of claim 10, further comprising computing the sharpness value of the area at the adjusted bowl depth, and determine a bowl width based on the sharpness value and the bowl depth, and wherein the second bowl view image is generated based on the bowl width.

13. The method of claim 12, further comprising varying the bowl depth for a defined range of depths, re-stitching the sensor data from two sensors based on the varied bowl depths, compute the sharpness value of the area for each varied bowl depth, and select a bowl depth corresponding to the defined sharpness value to determine the bowl width.

14. The method of claim 12, further comprising determining feature points of the double object, and determining the bowl width based on the feature points.

15. The method of claim 14, further comprising adjusting an initial bowl width, performing a re-stitching of the sensor data based on the adjusted initial bowl width, and evaluating the feature points of the double object to determine the bowl width.

16. The method of claim 15, further comprising selecting the adjusted initial bowl width that corresponds to the feature points of the double object merging as the bowl width.

17. The method of claim 14, further comprising: determining a depth of the feature point based on triangulation and determining the bowl width based on the depth of the feature point.

18. The method of claim 10, further comprising displaying, by a display system within the vehicle, the bowl view image to the operator of the vehicle.

\* \* \* \* \*